T. A. WHITING.
Improvement in Sleigh-Runners.
No. 129,772. Patented July 23, 1872.
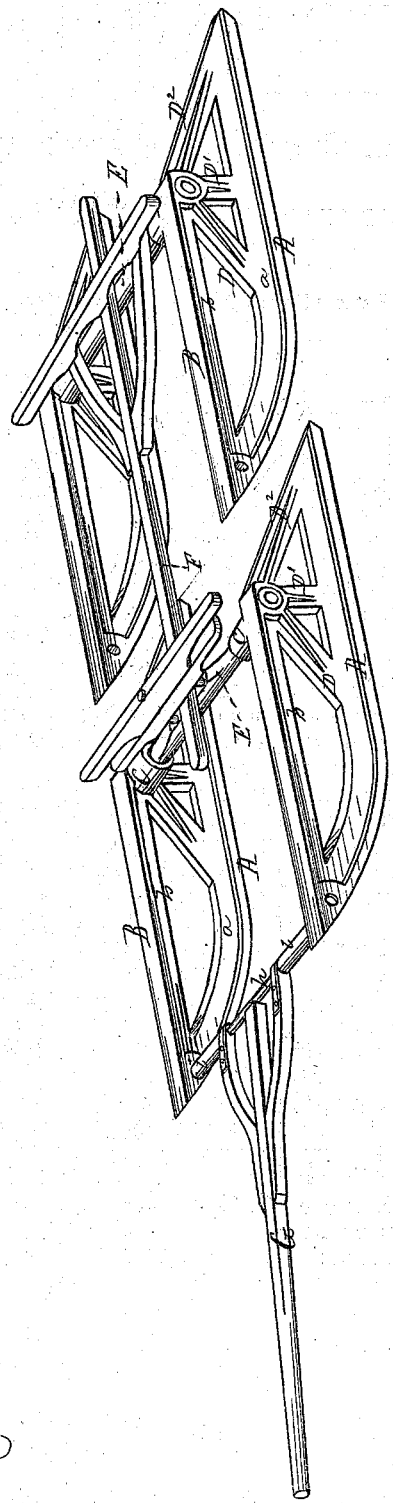
Witnesses
N B Smith
Edmund Masson
Inventor.
Timothy A Whiting
by A U Smith
Atty

UNITED STATES PATENT OFFICE.

TIMOTHY A. WHITING, OF CATLETT STATION, VIRGINIA.

IMPROVEMENT IN SLEIGH-RUNNERS.

Specification forming part of Letters Patent No. 129,772, dated July 23, 1872.

*To all whom it may concern:*

Be it known that I, TIMOTHY A. WHITING, of Catlett Station, county of Fauquier, State of Virginia, have invented certain new and useful Improvements in Sleigh-Runners; of which the following is a full, clear, and exact description, reference being had to the accompanying drawing making part of this specification, which is a perspective view of a bob-sleigh representing the runners constructed in accordance with my invention.

My invention consists in a novel construction of flanged shoe-rail and spokes or braces, and the arrangement of the same relative to each other and to the elongated hub or sleeve, as hereinafter described, whereby the whole may be cast in one piece, and at the same time be made light and substantial, and also economical in construction.

To enable others to make and use my improved runner, I will proceed to describe the same with reference to the drawing.

A represents the shoe, made in an inverted T form in such manner as to give it as broad a tread as may be desired, said tread being provided with a central vertical stiffening-rib, represented at $a$. B is the top rail, similar in form with its central rib, $b$, formed on its under face, and joining the rib $a$ at the forward end. C is the hub or sleeve, and D $D^1$ $D^2$ the flanged or ribbed spokes, arranged in lines radial to the hub C, and terminating at their lower ends in the rib $a$ of the runner A, as shown. From the foregoing description it will be apparent that, the several parts of the runner— viz., the shoe, rail, and spoke or braces—all being ribbed or flanged and so arranged as to center in or around a common support or hub, the entire runner may be made of metal, cast in a single piece, and yet be made almost if not quite as light, and at even less expense, than if made of wood and ironed in the usual manner. The hub C is elongated, and extends inward from the runner in such manner as to afford an extended bearing on the axle E, and may be connected thereto by a nut similar to the ordinary mode of holding wheels upon their axles, and in such manner as to leave each runner free independently of the other to follow or conform to the face of the ground over which it is drawn. F is the coupling-pole or frame for uniting two pairs of runners in the usual manner, and G is the draft-pole, attached to a rod, $h$, which connects the forward ends of the front pair of runners; said rod $h$ being mounted in sleeves $i$ formed upon or attached to the runners A in any convenient manner.

Having now described my invention, what I claim as new, and desire to secure by Letters Patent, is—

The herein-described sled-runner, consisting of the sole or shoe A, rail B, hub or sleeve C, and spokes D $D^1$ $D^2$, these several parts being cast of metal, in one and the same piece, substantially as set forth.

TIMOTHY A. WHITING.

Witnesses:
  R. A. HYDE,
  ALEX. MAHON.